(12) United States Patent
Stephens et al.

(10) Patent No.: US 7,859,307 B2
(45) Date of Patent: *Dec. 28, 2010

(54) HIGH SPEED TRANSIENT ACTIVE PULL-UP I²C

(75) Inventors: Vern Stephens, Phoenix, AZ (US); Bret Walters, Chandler, AZ (US)

(73) Assignee: Microchip Technology Incorporated, Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/711,433

(22) Filed: Feb. 24, 2010

(65) Prior Publication Data

US 2010/0142629 A1    Jun. 10, 2010

Related U.S. Application Data

(63) Continuation-in-part of application No. 12/206,122, filed on Sep. 8, 2008, now Pat. No. 7,800,408.

(51) Int. Cl.
*H03K 19/094* (2006.01)

(52) U.S. Cl. .......................... 326/86; 326/87; 710/105; 710/305

(58) Field of Classification Search ............. 326/56–58, 326/82–83, 86–87, 93, 95, 98; 710/100, 710/105, 305
See application file for complete search history.

(56) References Cited

U.S. PATENT DOCUMENTS

| | | | | |
|---|---|---|---|---|
| 5,617,362 | A * | 4/1997 | Mori et al. | 365/189.05 |
| 6,119,178 | A * | 9/2000 | Martin et al. | 710/72 |
| 6,173,350 | B1 * | 1/2001 | Hudson et al. | 710/100 |
| 6,586,968 | B1 * | 7/2003 | Schauer et al. | 326/86 |
| 6,693,678 | B1 * | 2/2004 | Tults et al. | 348/571 |
| 6,968,472 | B2 * | 11/2005 | Fernald | 713/400 |

(Continued)

FOREIGN PATENT DOCUMENTS

KR   20050003895   1/2005

(Continued)

OTHER PUBLICATIONS

Notification of Transmittal of the International Search Report and the Written Opinion of the International Searching Authority, (13 pages), Apr. 1, 2010.

*Primary Examiner*—James H. Cho
*Assistant Examiner*—Jason M Crawford
(74) *Attorney, Agent, or Firm*—King & Spalding L.L.P.

(57) ABSTRACT

An I²C-bus compatible device when functioning as a clock master comprises a transient active pull-up I²C ("TAP-I²C") logic module having high side driver transistors, e.g., P-channel field effect transistors (FETs), coupled between a positive supply voltage and respective serial data ("SDA") and serial clock ("SCL") lines on the I²C bus. The high side output driver transistors for the SDA and SCL lines are sequentially pulsed on by the TAP I²C logic module for brief periods to first precharge the capacitance of the SDA line and then precharge the capacitance of the SCL line during low to high logic level transitions thereof. Precharging the capacitances of the I²C bus lines will also accelerate bus transfer operations for all I²C compatible devices since the capacitances of the I²C bus lines will be charged much faster through the low impedance active pull-up driver transistors then through the passive pull-up resistors.

21 Claims, 12 Drawing Sheets

U.S. PATENT DOCUMENTS

| | | | |
|---|---|---|---|
| 7,430,259 B2 * | 9/2008 | North et al. | 375/354 |
| 7,521,963 B1 * | 4/2009 | Xin-LeBlanc | 326/63 |
| 2005/0094676 A1 * | 5/2005 | Iwami et al. | 370/527 |
| 2006/0242348 A1 * | 10/2006 | Humphrey et al. | 710/305 |
| 2007/0156935 A1 * | 7/2007 | Ellison | 710/106 |
| 2007/0247184 A1 * | 10/2007 | Ng et al. | 326/30 |
| 2008/0034134 A1 * | 2/2008 | Kumar | 710/61 |
| 2008/0177918 A1 * | 7/2008 | Lee et al. | 710/110 |
| 2008/0189459 A1 * | 8/2008 | Takeuchi | 710/110 |

FOREIGN PATENT DOCUMENTS

| | | |
|---|---|---|
| WO | 99/31598 | 6/1999 |
| WO | 2007/124304 | 11/2007 |

* cited by examiner (a)

(b)

HIGH SPEED TRANSIENT ACTIVE PULL-UP I²C

RELATED PATENT APPLICATION

This application is a continuation-in-part of and claims priority to commonly owned U.S. patent applications Ser. No. 12/206,122; filed Sep. 8, 2008; now U.S. Pat. No. 7,800,408; issued Sep. 21, 2010; entitled "High Speed Transient Active Pull-Up I2C," by Veto Stephens and Bret Walters, and is hereby incorporated by reference herein for all purposes.

TECHNICAL FIELD

The present disclosure relates to Inter-IC (I²C) bus compatible devices, and more particularly, to improving I²C-bus protocol speed and average power consumption of I²C-bus compatible devices.

BACKGROUND

Interconnecting together integrated circuit (IC) devices with a simple low cost bus arrangement was desired so Royal Philips Electronics of the Netherlands developed a simple bi-directional 2-wire bus for efficient inter-IC control. This bus is called the Inter-IC or I²C bus. All I²C-bus compatible devices incorporate an on-chip interface that allows them to communicate directly with each other via the I²C-bus. The I²C-bus uses open collector (drain) arrangements that depend on passive pull-up resistors to overcome the connected bus capacitance. Thus, charging the bus capacitance to a logic high has a time constant determined by a combination of the connected pull-up resistance and bus capacitance, e.g., RC time constant. Faster bus speeds require pull-up resistors having lower resistance for a given bus capacitance, however, lower resistance increases the average power demand of the I²C-bus compatible devices. The I²C-Bus Specifications, Version 1.0-1992, Version 2.0-1998, and Version 2.1-2000 by Royal Philips Electronics of the Netherlands are incorporated by reference herein for all purposes.

SUMMARY

What is needed is a way to increase I²C-bus speed while reducing average power consumption of the I²C-bus compatible devices when utilizing the I²C-bus. According to the teachings of this disclosure, an I²C-bus compatible device when functioning as a clock master may comprise a transient active pull-up I²C ("TAP-I²C") module having high side driver transistors, e.g., P-channel field effect transistors (FETs), coupled between a positive supply voltage, e.g., Vdd, and respective serial data ("SDA") and serial clock ("SCL") lines on the I²C bus. The high side output driver transistors for the SDA and SCL lines are sequentially pulsed on by the TAP I²C module for brief periods to first precharge the capacitance of the SDA line and then precharge the capacitance of the SCL line during low to high logic level transitions. Precharging the capacitances of the I²C bus lines will accelerate bus transfer operations for all of the I²C compatible devices connected thereto on the normally open drain (resistive pull-up) I²C bus since the voltage level rise time during the low to high logic level transition is so much shorter when using the TAP-I²C pulse then just depending upon on the RC time constant of the I²C-bus.

I²C devices, even those not equipped with the TAP-I²C module enhancement would thereby be accelerated as well, even to speeds of 5-10 MHz, assuming the other devices were not speed limited due to other reasons, e.g., internal logic speed constraints. After the precharge pulse period, the output I²C bus driver resumes its normal open drain configuration which allows the pull-up resistor to simply maintain the voltage (charge) on the SCL and SDA lines of the I²C bus.

In addition to precharging the bus, TAP-I²C module may also reduce the need for additional external pull-up resistors on the SCL and SDA lines of the I²C bus. Because of this, the resistance value of the pull-up resistors on the SDA and SCL lines of the I²C bus can be increased in resistance values, thus reducing power consumption for all of the connected I²C-bus compatible devices. In prior technology I²C systems, faster data transfer applications required stronger (lower resistance value) pull-up resistors to charge the I²C bus lines (SDA and SCL) faster (RC time constant) which created a higher power demand during operation of the I²C-bus compatible devices. However, according to the teachings of this disclosure, a pull-up resistor now is merely used to maintain the logic level state, not to substantially charge the bus capacitance during a transition to a logic high.

According to a specific example embodiment of this disclosure, an apparatus for rapidly charging I²C bus lines comprises: a first time delay circuit; a second time delay circuit; an SDA line driver coupled to an SDA line of an I²C bus; an SCL line driver coupled to an SCL line of the I²C bus; wherein: the first time delay circuit generates a first pulse upon detection of an internal SDA signal at a first logic level, the first pulse having a first pulse time duration, the second time delay circuit generates a second pulse upon detection of completion of the first pulse and detection of an internal SCL signal at the first logic level, the second pulse having a second pulse time duration, the first pulse time duration is shorter than a time duration of the internal SDA signal; the second pulse time duration is shorter than a time duration of the internal SCL signal; and whereby: the SDA line driver charges the SDA line capacitance through a low impedance circuit during the first pulse time duration, and the SCL line driver charges the SCL line capacitance through a low impedance circuit during the second pulse time duration.

According to another specific example embodiment of this disclosure, a method for rapidly charging I²C bus lines comprises the steps of: generating a first pulse at a first logic level upon detection of an internal SDA signal, the first pulse having a first pulse time duration that is shorter than a time duration of the internal SDA signal; generating a second pulse at the first logic level upon detection of completion of the first pulse and detection of an internal SCL signal, the second pulse having a second pulse time duration that is shorter than a time duration of the internal SCL signal; charging SDA line capacitance of an I²C bus through a low impedance SDA line driver during the first pulse time duration; and charging SCL line capacitance of the I²C bus through a low impedance SCL line driver during the second pulse time duration.

BRIEF DESCRIPTION OF THE DRAWINGS

A more complete understanding of the present disclosure thereof may be acquired by referring to the following description taken in conjunction with the accompanying drawings wherein.

Figure 1:
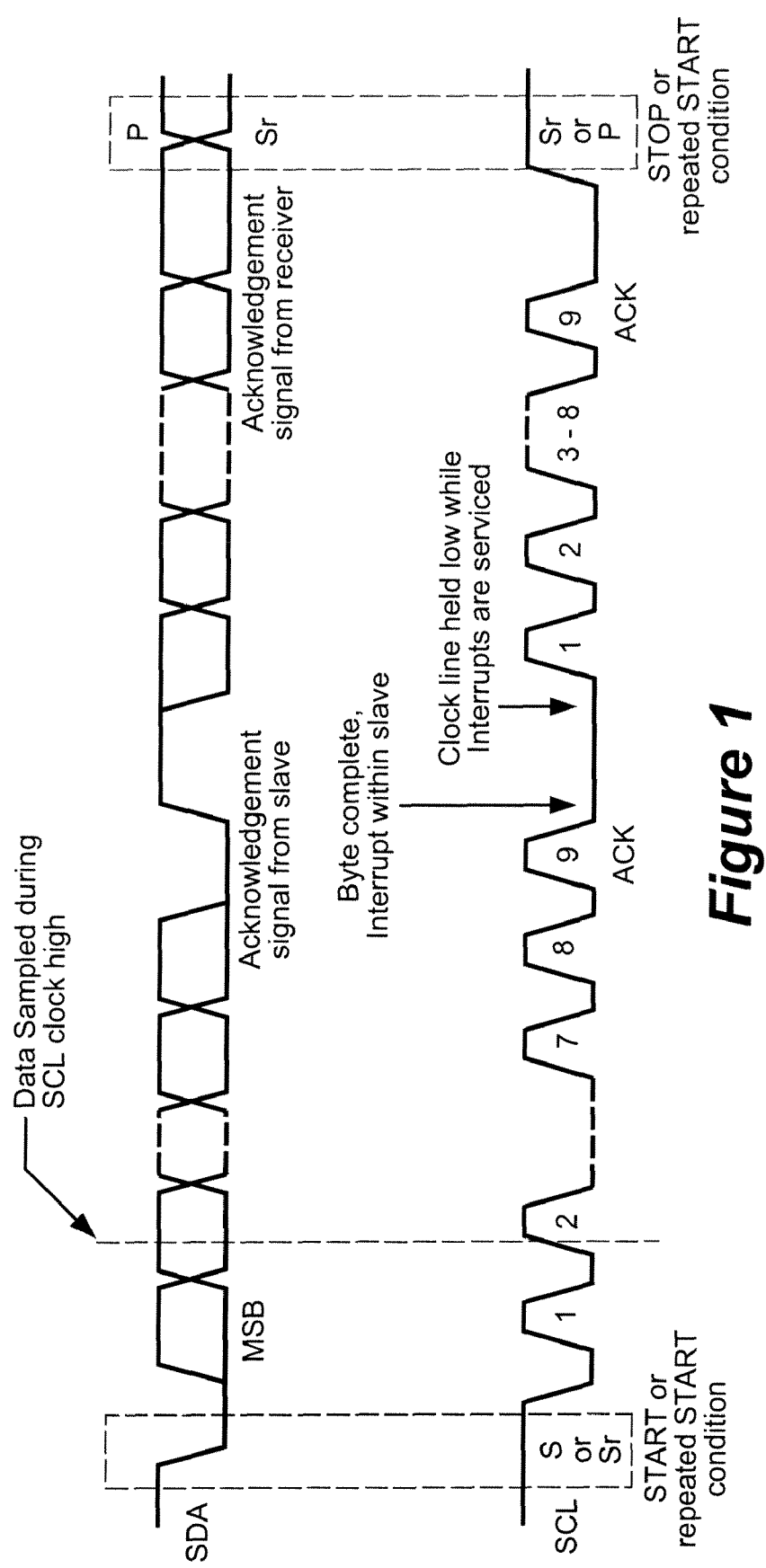
FIG. 1 illustrates a schematic timing diagram of a typical I²C data transfer.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

Referring now to the drawings, the details of example embodiments are schematically illustrated. Like elements in the drawings will be represented by like numbers, and similar elements will be represented by like numbers with a different lower case letter suffix.

Referring to FIG. 1, depicted is a schematic timing diagram of a typical $I^2C$ data transfer. Logic levels of the SDA line are sampled on the rising logic level edges of the SCL line. Since the $I^2C$-Bus Specification specifies open collector (drain) drivers with pull-up resistors, the rising edge of a logic level change is dependent upon the resistance of the pull-up resistor and the capacitance of the SDA and SCL bus lines.

Figure 2:
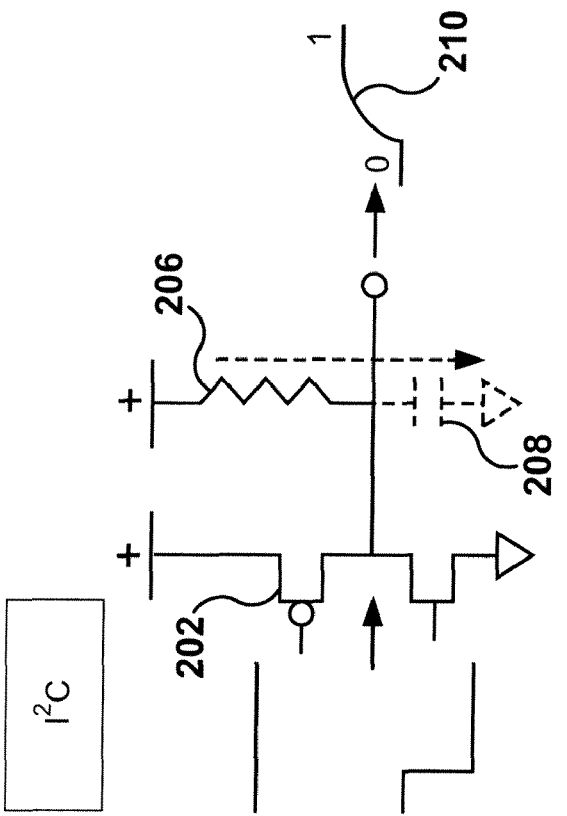
FIG. 2 illustrates a schematic diagram of an output driver not using a transient active pulse (TAP) and the resulting output logic level transition rise time waveform.

Referring to FIG. 2, depicted is a schematic diagram of an output driver not using a transient active pulse (TAP) and the resulting output logic level transition rise time waveform. This RC time constant (e.g., pull-up resistor 206 and line capacitance 208) controlled rise time 210 is illustrated in FIG. 2 where the P-channel FET 202 is held in the off state at all times.

Figure 3:
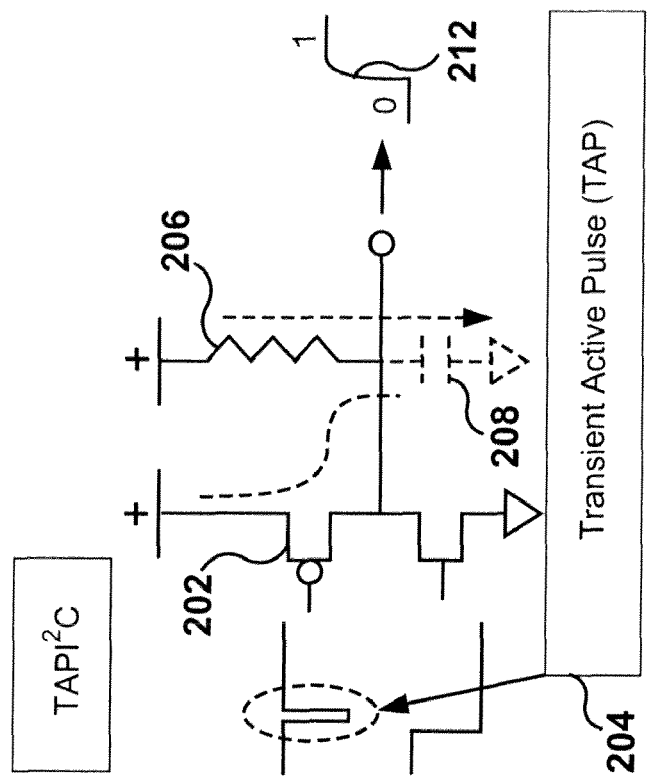
FIG. 3 illustrates a schematic diagram of an output driver using a transient active pulse (TAP) and the resulting output logic level transition rise time waveform, according to the teachings of this disclosure.

Referring to FIG. 3, depicted is a schematic diagram of an output driver using a transient active pulse (TAP) and the resulting output logic level transition rise time waveform, according to the teachings of this disclosure. When a transient active pulse (TAP) 204 is introduced to control the on time of the P-channel FET 202, the P-channel FET 202 substantially shorts out the pull-up resistor 206 and effectively charges the capacitance 208 much faster since the on resistance (e.g., shorter RC time constant) of the P-channel FET 202 is substantially lower than the pull-up resistor 206. The TAP 204 need only be a very short duration pulse, e.g., 24 to 42 nanoseconds, depending upon the desired data rate of the $I^2C$ bus. By controlling the P-channel FET 202 with the TAP 204 so as to quickly charge the capacitance 208, $I^2C$ bus operating speed may be significantly increased and the $I^2C$ bus power usage reduce by increasing the resistance of the pull-up resistor 206 (one for the SDA line and one for the SCL line). For example, a higher resistance pull-up resistor 206 will effectively reduce the average operating power from an $I^2C$ compatible device sending data onto the $I^2C$ bus.

Figure 4A:
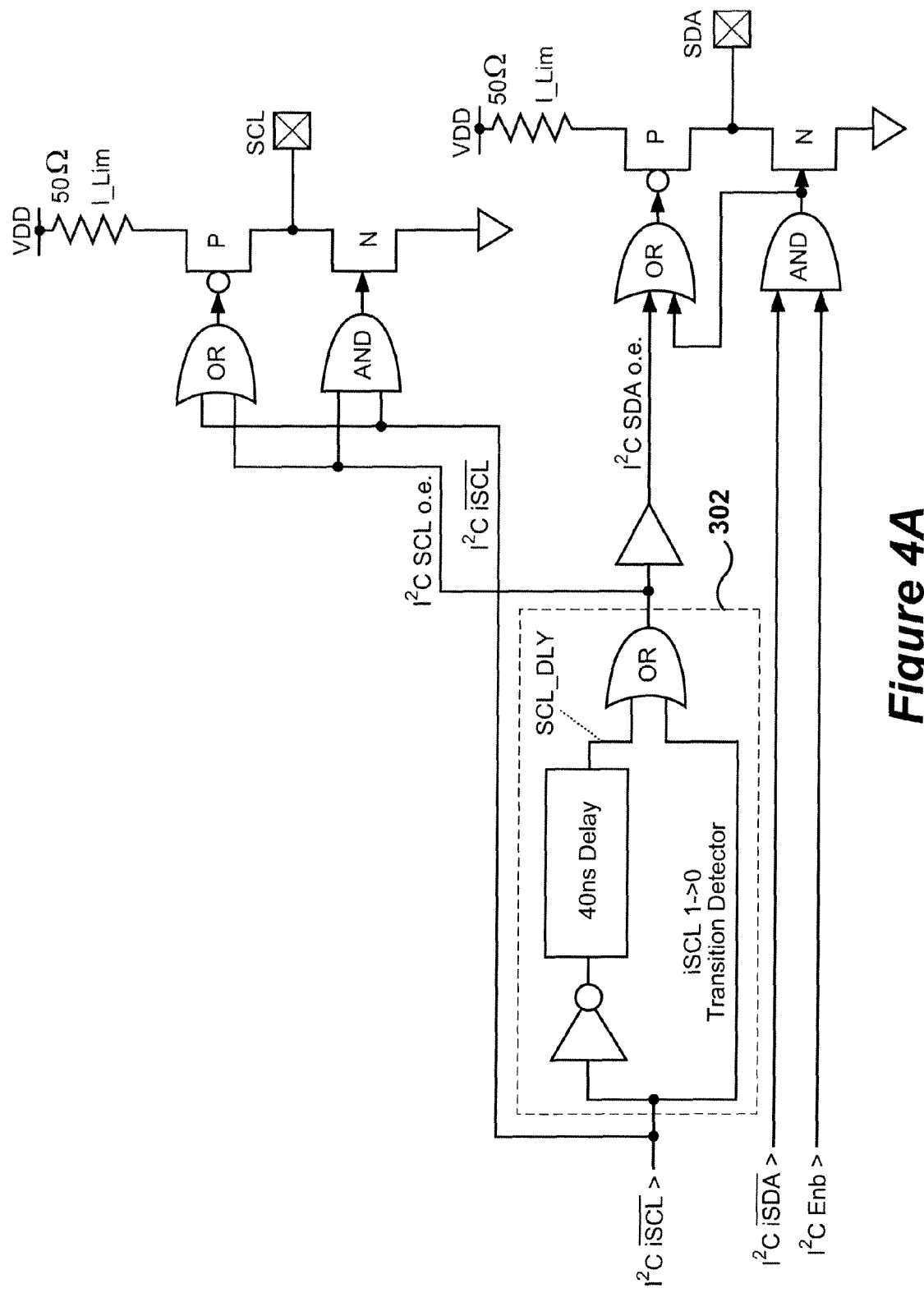
FIGS. 4A and 4B illustrate schematic logic and timing diagrams, respectively, of an experimental test TAP-$I^2C$ logic circuit used for operational evaluation, according to the teachings of this disclosure.
Figure 4B:
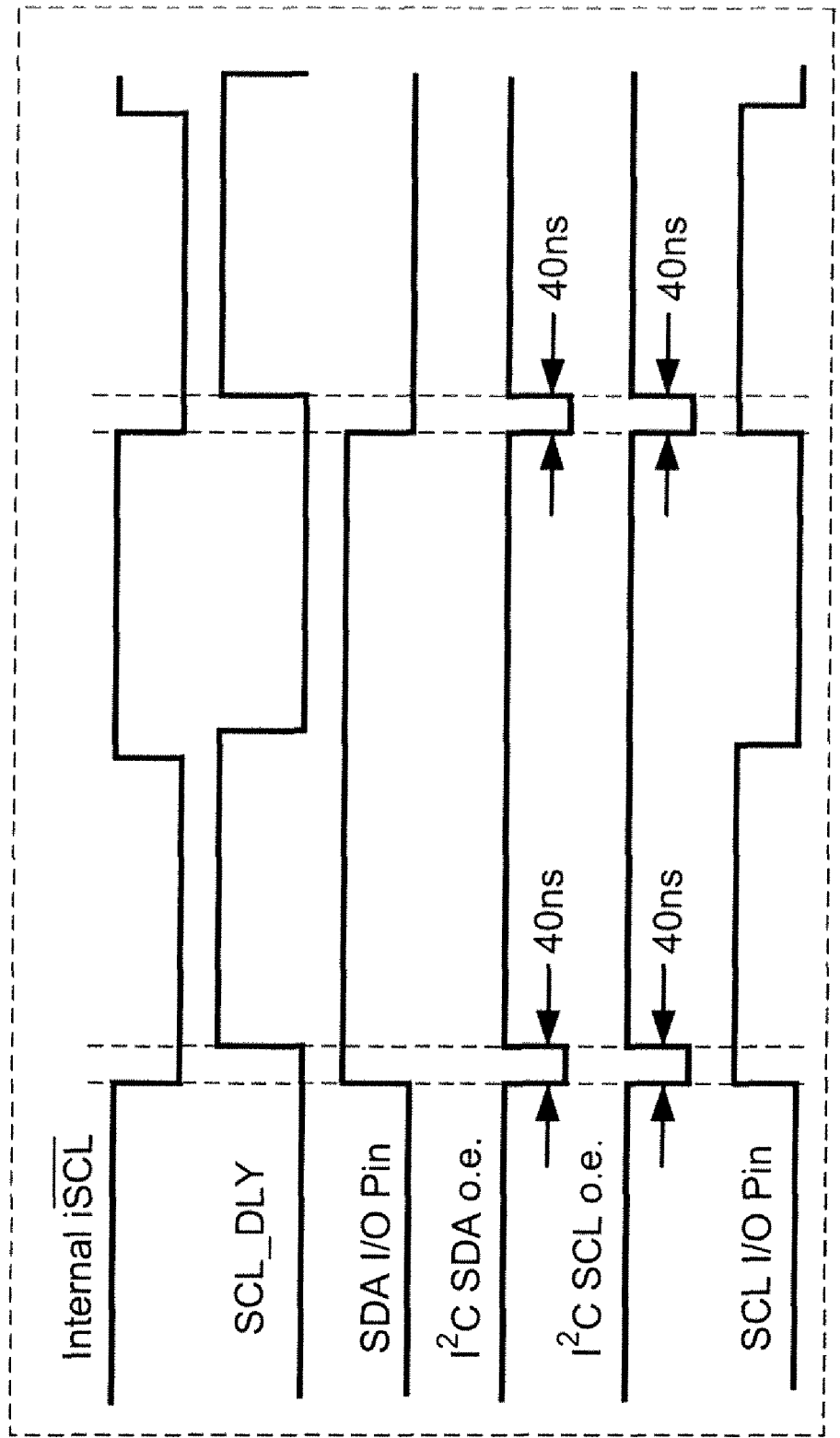

Referring to FIGS. 4A and 4B, depicted are schematic logic and timing diagrams, respectively, of an experimental test TAP-$I^2C$ circuit used for operational evaluation, according to the teachings of this disclosure. A short delay circuit 302, e.g., 40 nanoseconds, may be used to sequentially generate the TAP signals on the SDA and SCL bus lines. FIG. 4B shows typical timing waveforms for respective signals of the schematic logic diagram of FIG. 4A are shown.

Figure 5:
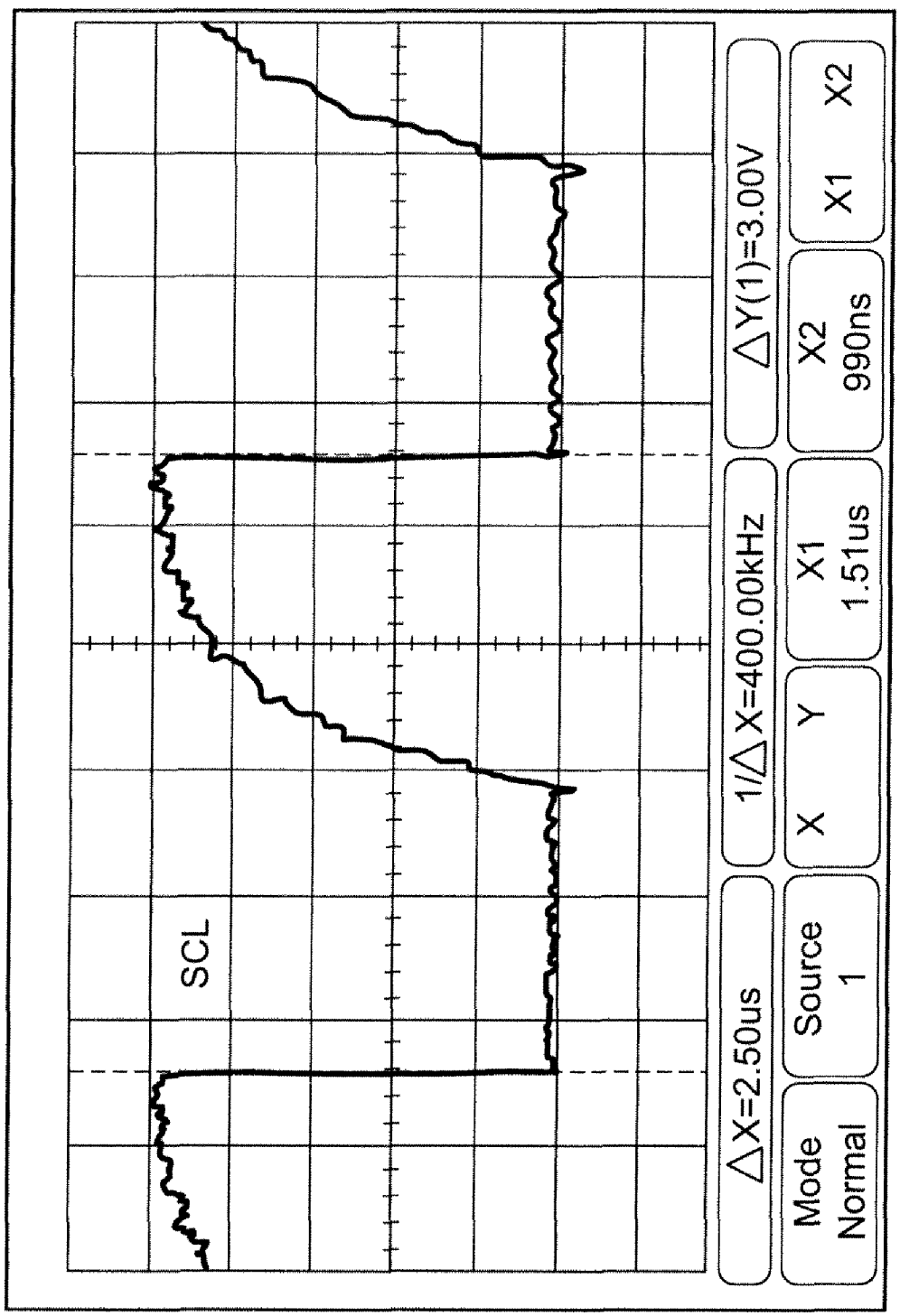
FIG. 5 illustrates a voltage versus time waveform of the output logic level transition of the circuit shown in FIG. 4A with the TAP feature disabled.

Referring to FIG. 5, depicted is a voltage versus time waveform of the output logic level transition of the circuit shown in FIG. 4A with the TAP feature disabled. The rise time of a logic low to high transition shows a typical RC time constant gradual rise for a 400 kHz waveform on an open drain controlled bus line having a capacitance of about 100 picofarads and a pull-up resistor of about 2,000 ohms.

Figure 6:
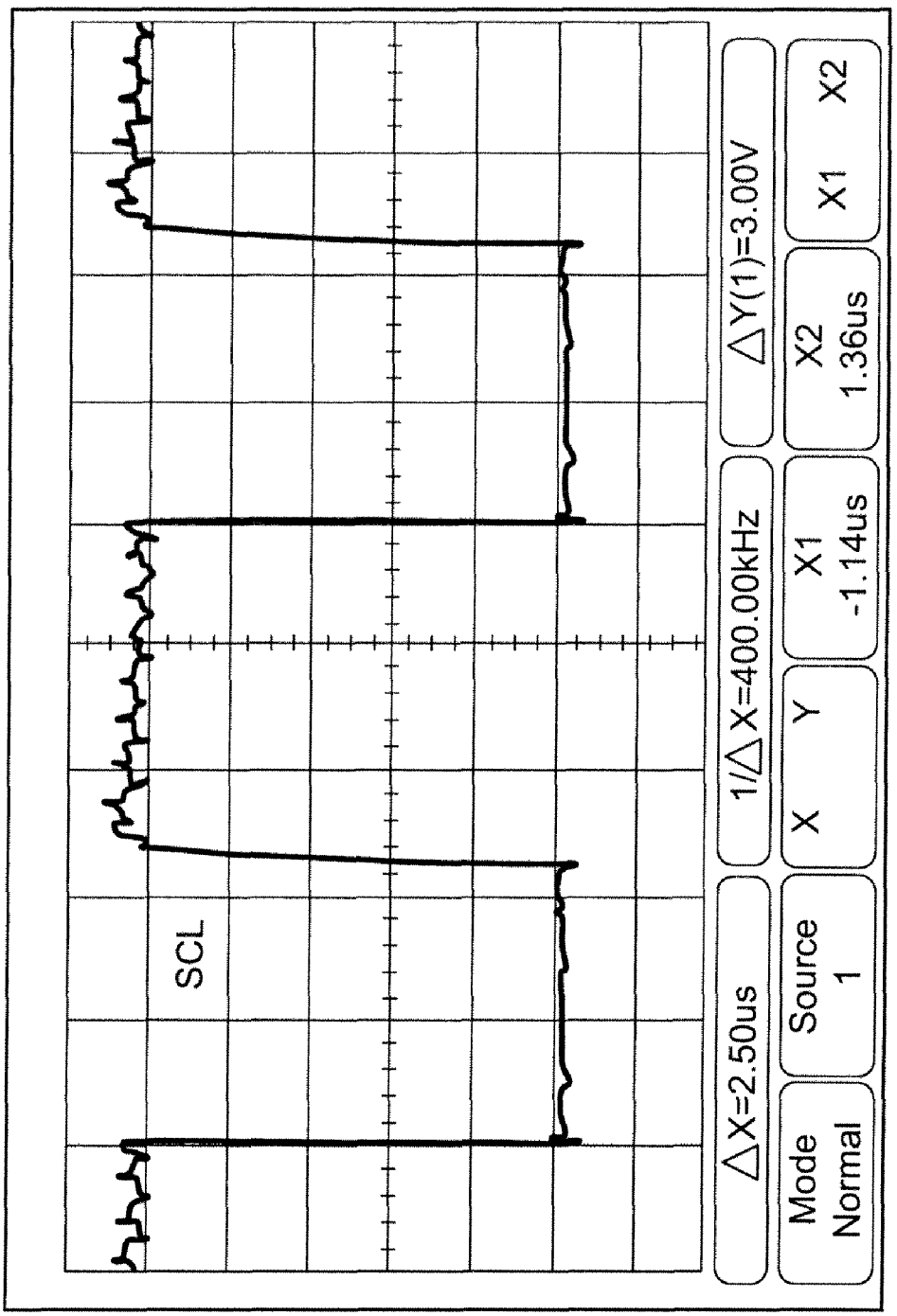
FIG. 6 illustrates is a voltage versus time waveform of the output logic level transition of the circuit shown in FIG. 4A with the TAP feature enabled.

Referring to FIG. 6, depicted is a voltage versus time waveform of the output logic level transition of the circuit shown in FIG. 4 with the TAP feature enabled. The rise time of a logic low to high transition as shown in FIG. 6 is for a 400 kHz waveform on a "pseudo-open" drain controlled bus line having a capacitance of about 100 picofarads and a pull-up resistor of about 10,000 ohms, with a TAP circuit enabled for a short period of time at the beginning of a logic low to high transition. As may be readily observed, the waveform shown in FIG. 6 has a much faster rise time then the rise time of the waveform shown in FIG. 5. This is because the pull-up resistor 206 is effectively shorted out for a very brief time period, eg., 50 nanoseconds, thus charging the capacitance 208 much faster then could be charged through only a pull-up resistor. After the bus line capacitance 408 has been charged, the 10,000 ohm pull-up resistor merely maintains the voltage level on the bus line. Therefore average power is reduced while faster rise times may be accomplished, according to the teachings of this disclosure.

Figure 7:
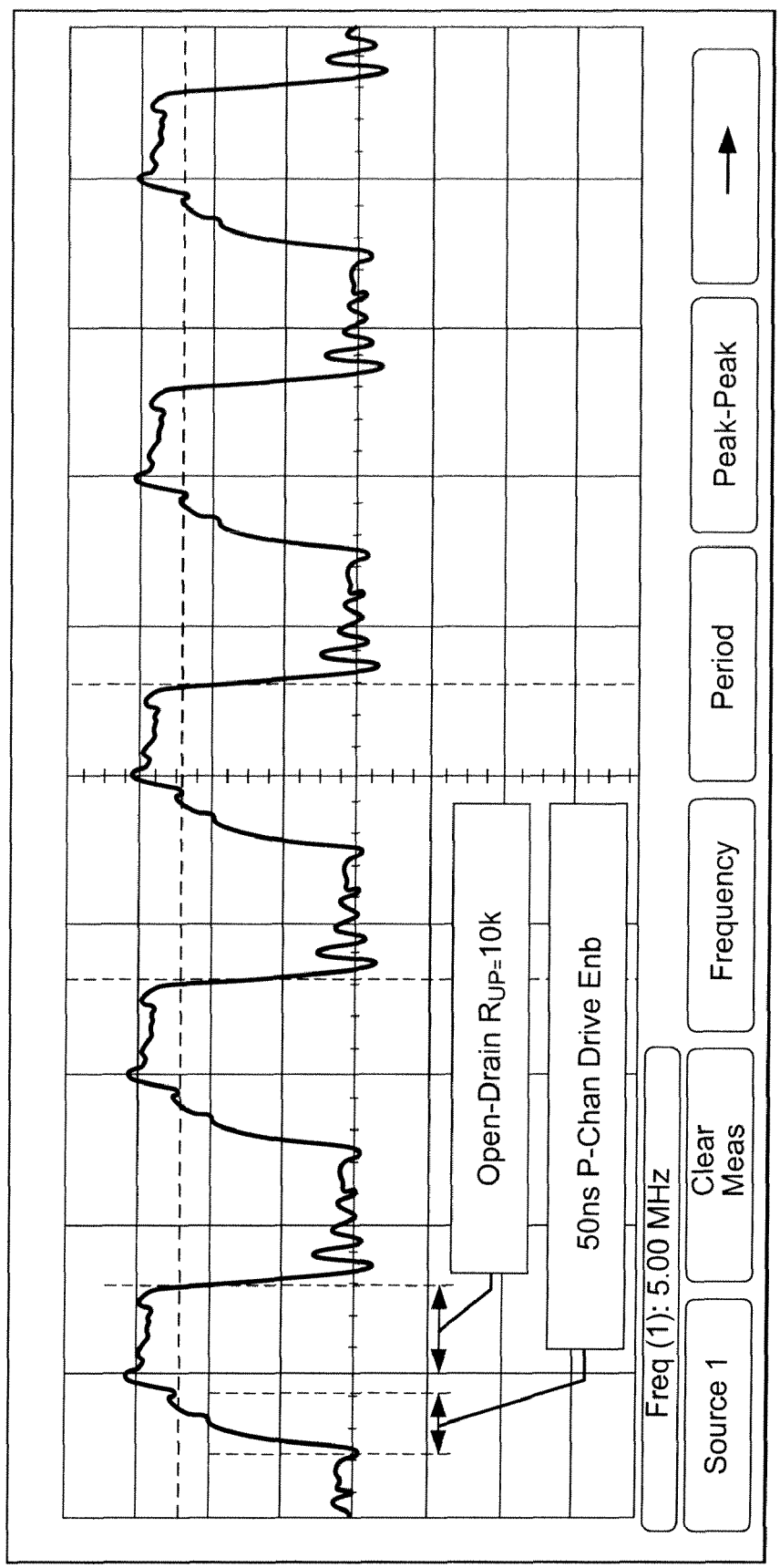
FIG. 7 illustrates a voltage versus time waveform of output logic level transitions of the circuit shown in FIG. 4A running at about 5 MHz with the TAP feature enabled.

Referring to FIG. 7, depicted is a voltage versus time waveform of output logic level transitions of the circuit shown in FIG. 4 running at about 5 MHz with the TAP feature enabled. A TAP of about 50 nanosecond duration was used to produce the logic signal waveforms shown in FIG. 7, wherein the bus line capacitance 408 was about 100 picofarads and the pull-up resistor 206 was about 10,000 ohms.

Figure 8:
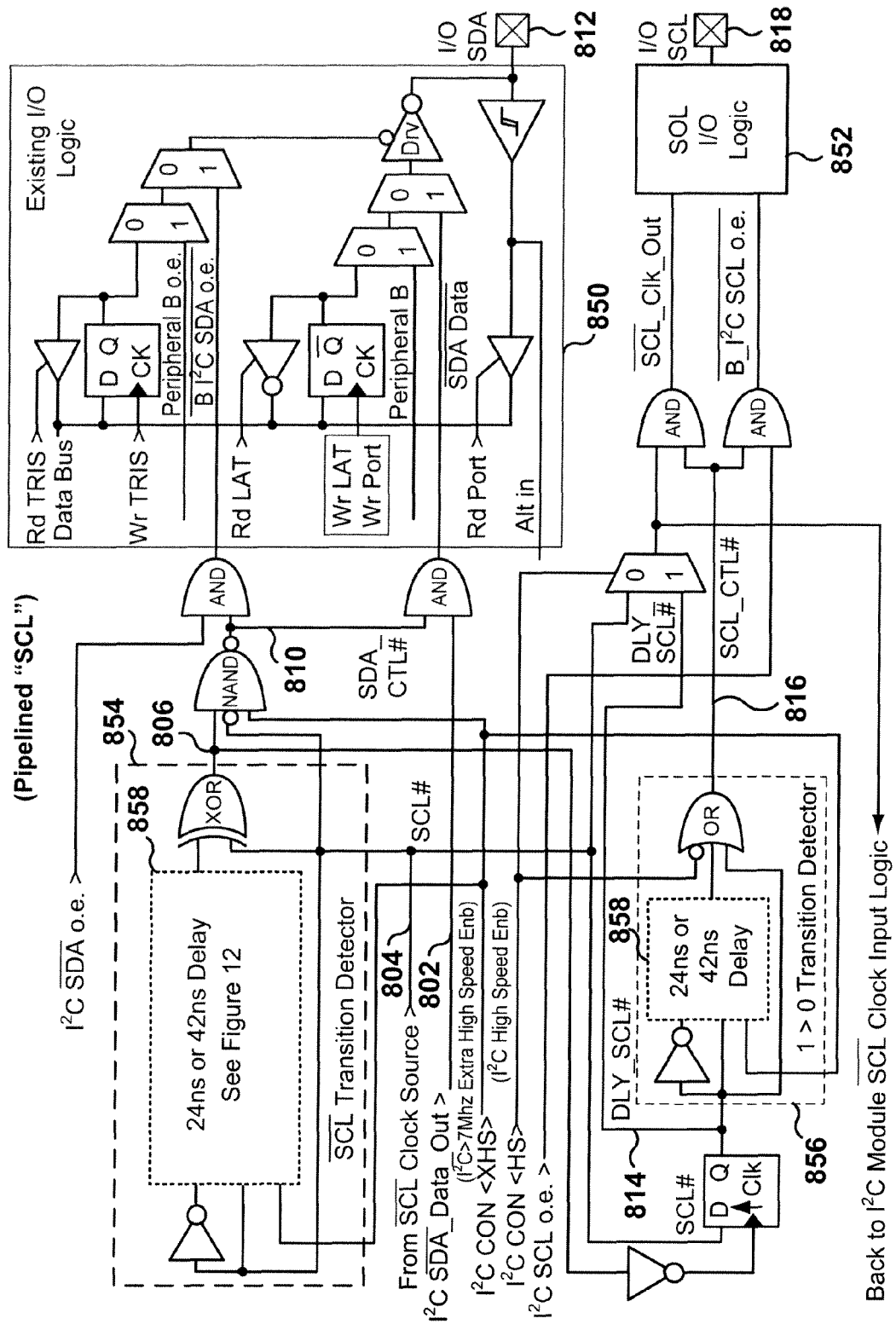
FIG. 8 illustrates a schematic logic diagram of a pipelined SCL implementation of a TAP-$I^2C$ logic module, according to a specific example embodiment of this disclosure.
Figure 9:
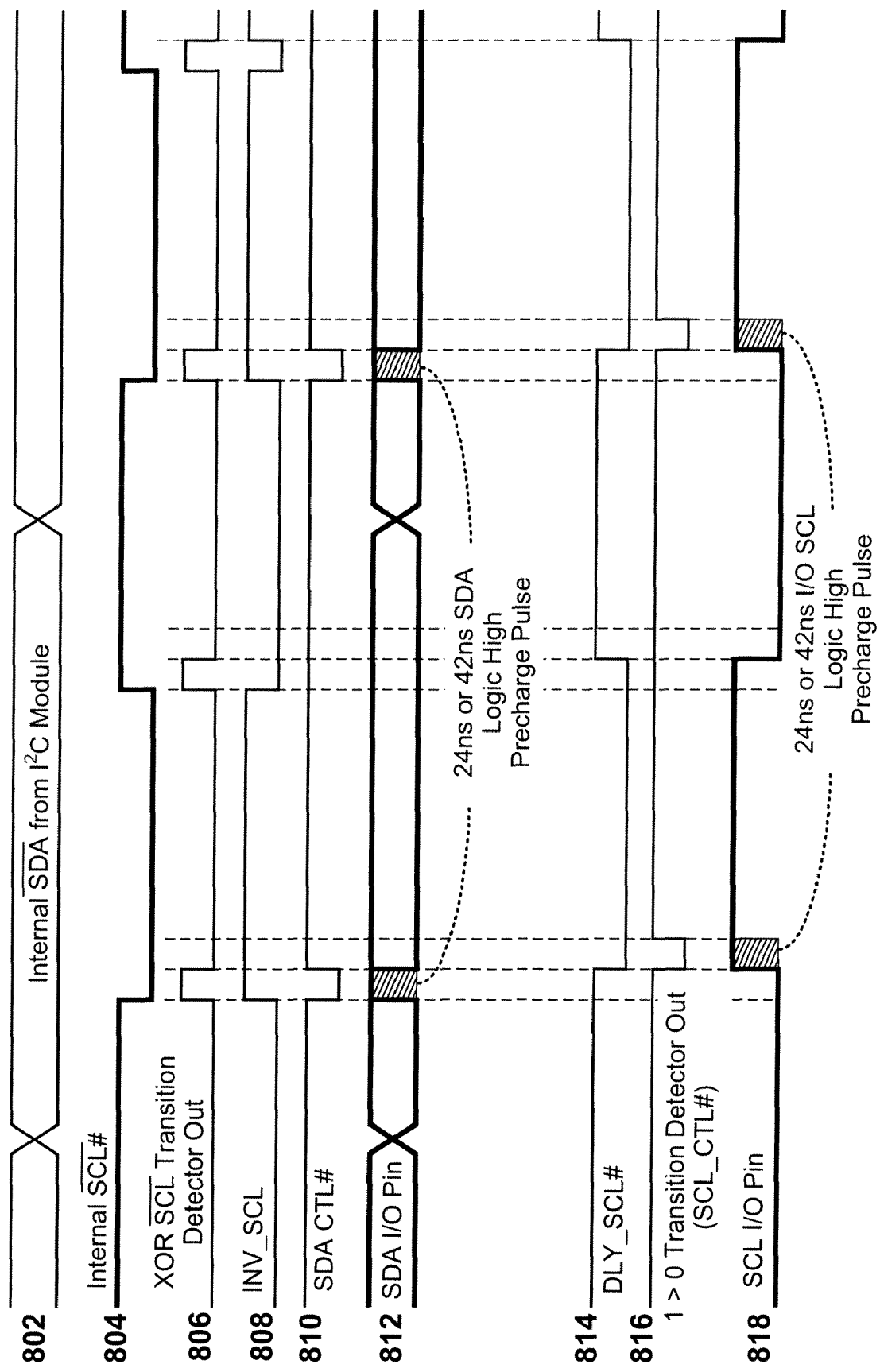
FIG. 9 illustrates a schematic timing diagram of the operation of the TAP-$I^2C$ logic module shown in FIG. 8.

Referring now to FIG. 8, depicted is a schematic logic diagram of a pipelined SCL implementation of a TAP-$I^2C$ logic module, according to a specific example embodiment of this disclosure. Also referring to FIG. 9, depicted is a schematic timing diagram of the operation of the TAP-$I^2C$ logic module shown in FIG. 8. An $I^2C$ input-output (I/O) logic for driving and receiving an SDA signal on the $I^2C$ bus is generally represented by the numeral 850. An $I^2C$ input-output (I/O) logic block for driving and receiving an SCL signal on the $I^2C$ bus is generally represented by the numeral 852. The SDA and SCL signals on the I²C bus are represented by the numerals 812 and 818, respectively.

An internal SDA signal 802 is generated from the I²C logic (not shown) then an internal SCL signal 804 is subsequently generated from the I²C logic (not shown). The logic level (state) of the SDA signal 802 is determined at the time the SCL signal 804 changes logic levels (transitions states). Shown in FIGS. 8 and 9 is an inverted internal SCL signal 804. An SCL transition detector 854 detects when the SCL signal 804 transitions from one logic level to the other logic level (binary logic has two logic level states) and will generate a first pulse 806 having a duration shorter than the duration of the SDA signal 802. This first pulse 806 causes the SDA TAP-I²C driver transistor 202 (FIG. 3) to precharge the capacitance of the SDA line through the low on impedance of the driver transistor 202 when the SDA signal 812 is at a high logic level. When the SDA signal 812 is at a low logic level no precharge of the capacitance of the SDA line is necessary since the driver transistor 208 (FIG. 3) is on and has a low on impedance.

After the SDA signal 812 I²C bus line has been substantially precharged to a high logic level, when appropriate, the SCL signal 818 I²C bus line is precharged to a high logic level by using a low on impedance driver transistor 202 controlled from the SCL I/O driver logic 852. A transition detector 856 detects when the first pulse 806 goes from a logic high to a logic low, then a second pulse 816 is generated by the transition detector 856. The second pulse 816 controls the pulse timing occurrence and duration during charging of the SCL signal 818 I²C bus line.

Since SDA signal 812 data is read when the SCL signal 818 transitions for a low to a high logic level, it is important that the SDA signal 812 logic level has settled to a stable logic level before the associated SCL signal 818 changes (transitions) from one logic level to the other. This is accomplished, according to the teachings of this disclosure, by "pipelining" the internal SCL signal 804 so that the SCL TAP-I²C driver transistor 202b turns on at a desired time after the TAP-I²C driver transistor 202a associated with the SDA signal 802 has turned on.

The length of time that the TAP-I²C driver transistor 202 may precharge the I²C bus capacitance is dependant upon the I²C data rate, and may be for example but is not limited to, about 24 nanoseconds (ns) or 42 ns. In the exemplary embodiment shown in FIG. 8, low speed, high speed and extra high speed data rates may be provided for by using the I²CCON<XHS> and I²CCON<HS> control lines for selection of either the 24 ns or 42 ns delay, respectively, and for the TAP-I²C pulse widths. Once the TAP-I²C pulse has charged the I²C bus line, according to the teachings of this disclosure, the normal pull-up resistor will maintain that logic level until the next logic level transition. The TAP-I²C logic module is compatible in operation with prior technology I²C devices and will enhance the operational speeds of all I²C devices operating on an I²C bus having at least one TAP-I²C device connected thereto.

Figure 12:
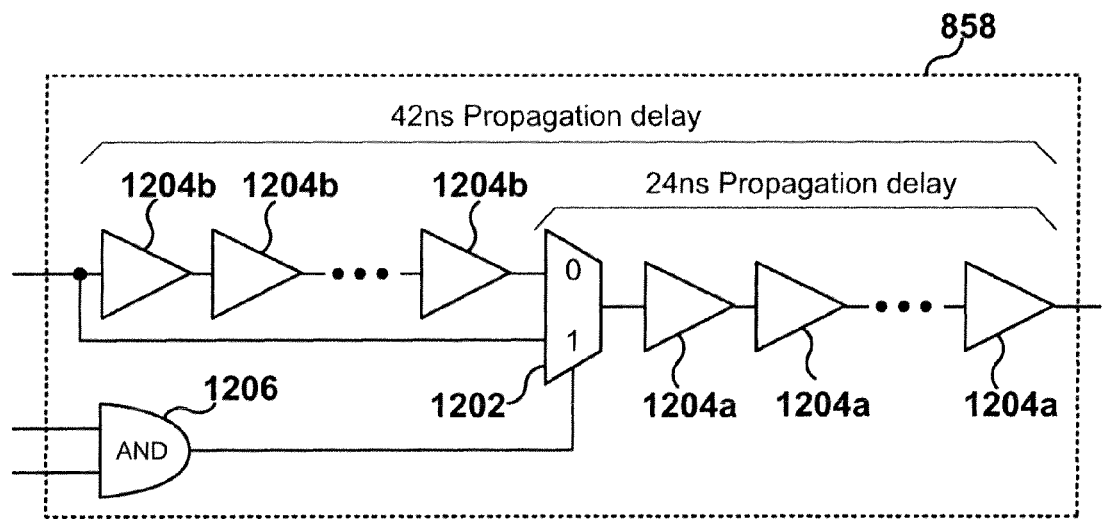
FIG. 12 illustrate schematic diagrams of specific example embodiments of the selectable dual delay circuits shown in FIG. 8.
Figure 12:
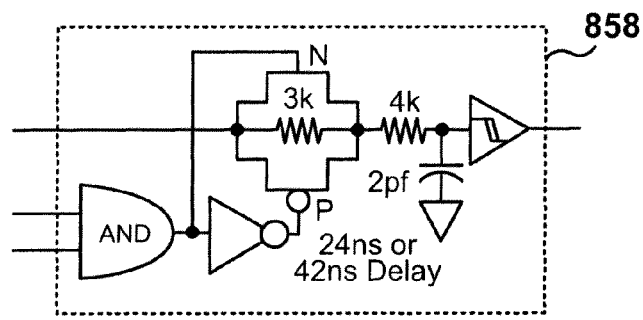

The SCL transition detector 854 and the transition detector 856 both include selectable dual delay circuits 858, e.g., 24 nanoseconds (ns) or 42 ns. Referring now to FIG. 12, depicted are schematic diagrams of specific example embodiments of these selectable dual delay circuits. Signal propagation delays may be implemented as shown in (a) with inherent logic gate delays by series connecting logic buffers 1204 and using a multiplexer 1202 to switch between a first or a second delay, e.g., 24 ns or 42 ns, etc. More than two selectable delays may be implemented as shown by increasing the number of inputs to the multiplexer 1202 and associated taps to the series connected logic buffers 1204. Signal propagation delays may also be implemented with selectable resistor-capacitor (RC) time delay circuits as shown in (b). It is contemplated and within the scope of this disclosure that other delay circuit implementations would be readily apparent to one of ordinary skill in the art of digital circuit design and having the benefit of this disclosure.

Figure 10:
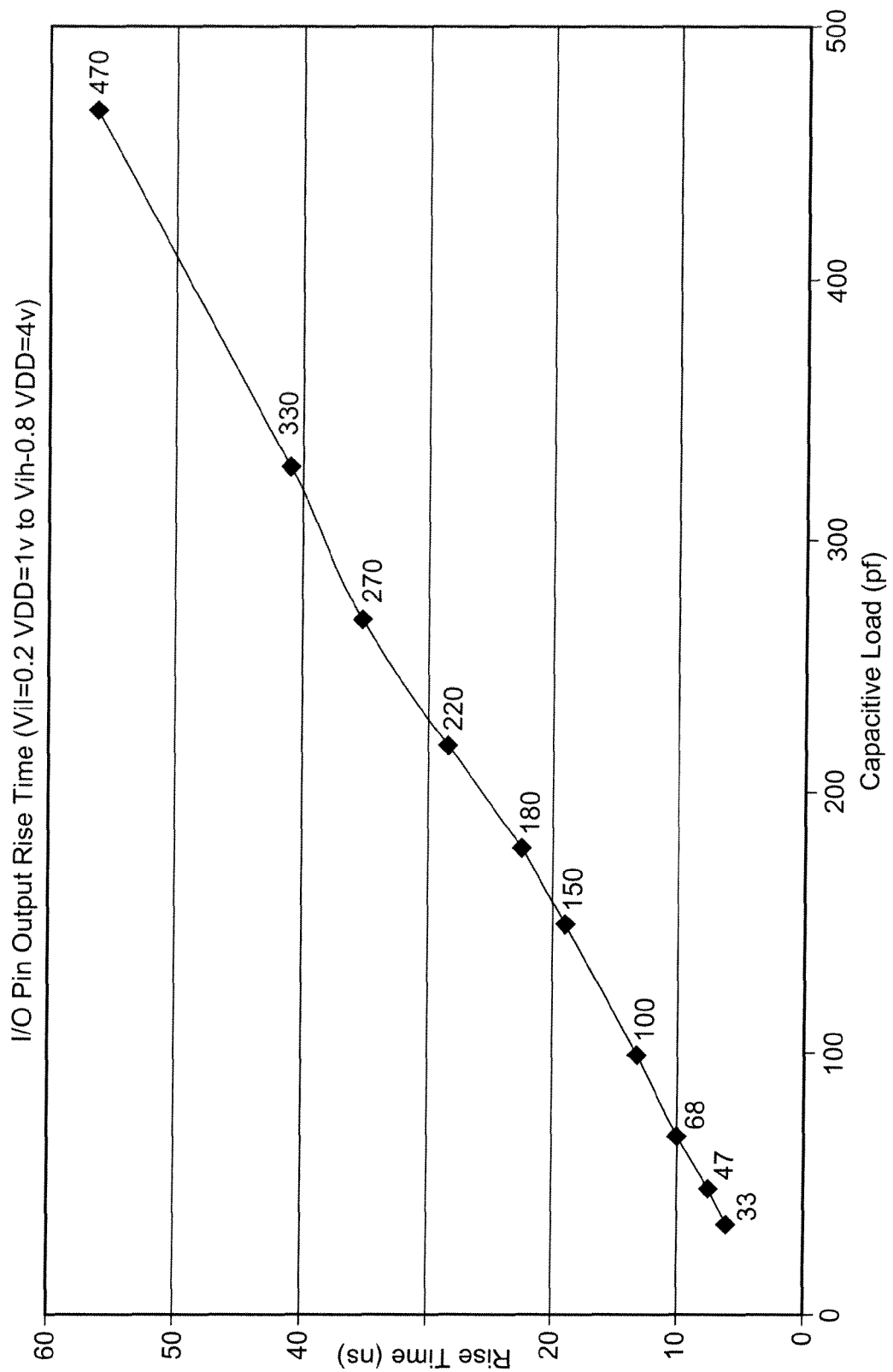
FIG. 10 illustrates a graph of signal rise time versus capacitive load on a signal line of the $I^2C$ bus when using the TAP-$I^2C$ logic, according to the teachings of this disclosure.

Referring to FIG. 10, depicted is a graph of signal rise time versus capacitive load on a signal line of the I²C bus when using the TAP-I²C logic module, according to the teachings of this disclosure.

Figure 11:
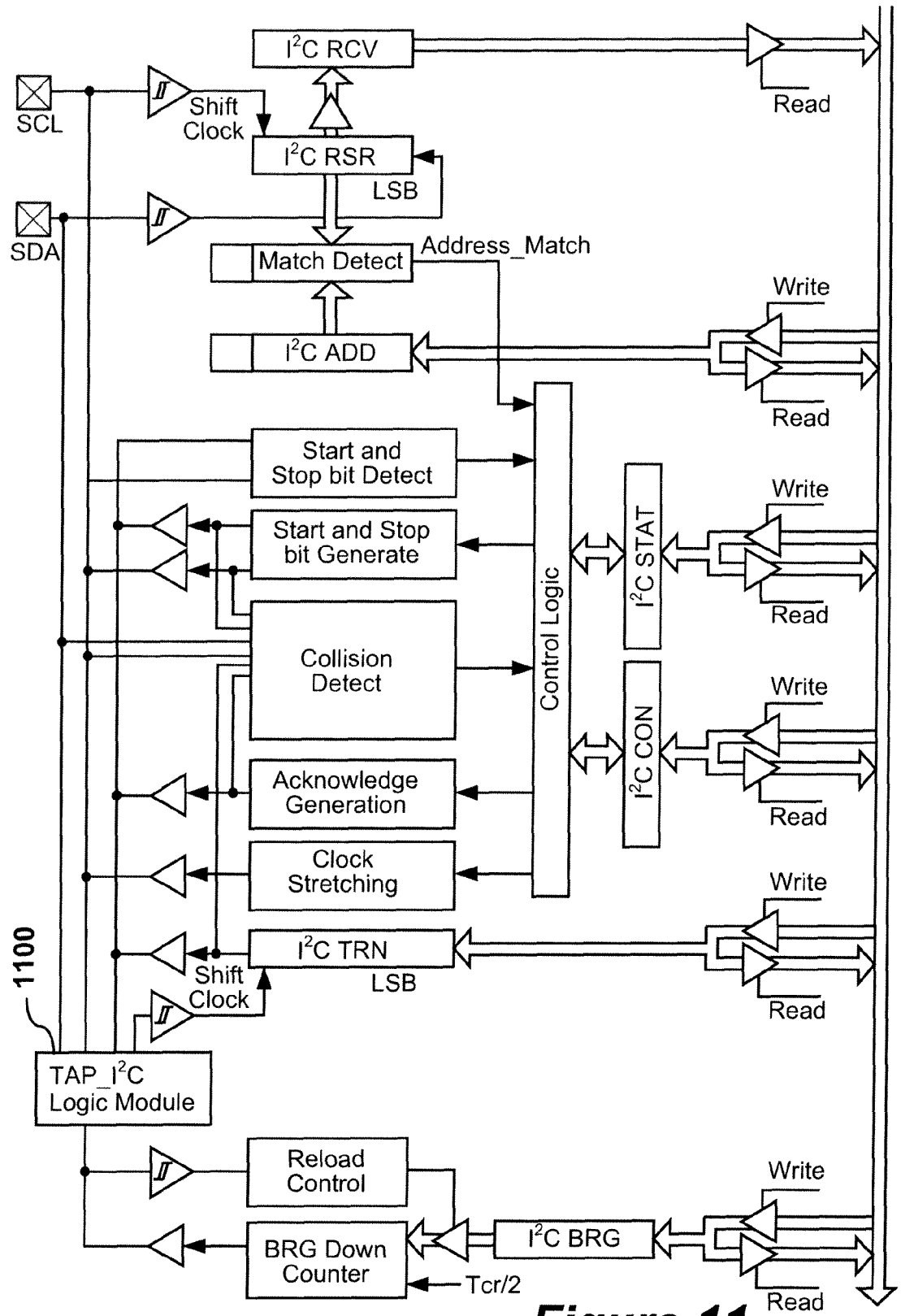
FIG. 11 illustrates a schematic block diagram of a TAP-$I^2C$ system incorporating the TAP-$I^2C$ logic module shown in FIG. 8, according to the teachings of this disclosure.

Referring to FIG. 11, depicted is a schematic block diagram of a TAP-I²C system incorporating the TAP-I²C logic module, according to the teachings of this disclosure. The TAP-I²C logic module, as shown in FIG. 8, is represented by the numeral 1100, and is integrated into a TAP-I²C system, according to the teachings of this disclosure.

While embodiments of this disclosure have been depicted, described, and are defined by reference to example embodiments of the disclosure, such references do not imply a limitation on the disclosure, and no such limitation is to be inferred. The subject matter disclosed is capable of considerable modification, alteration, and equivalents in form and function, as will occur to those ordinarily skilled in the pertinent art and having the benefit of this disclosure. The depicted and described embodiments of this disclosure are examples only, and are not exhaustive of the scope of the disclosure.

What is claimed is:

1. A method for rapidly charging I²C bus lines, said method comprising the steps of:
    generating a first pulse at a first logic level upon detection of an internal SCL signal, the first pulse having a first pulse time duration that is shorter than a time duration of an internal SDA signal;
    generating a second pulse at the first logic level upon detection of completion of the first pulse, the second pulse having a second pulse time duration that is shorter than a time duration of the internal SCL signal;
    charging SDA line capacitance of an I²C bus through a low impedance SDA line driver during the first pulse time duration when the internal SDA signal is at the first logic level; and
    charging SCL line capacitance of the I²C bus through a low impedance SCL line driver during the second pulse time duration.

2. The method according to claim 1, wherein the step of charging the SDA line capacitance is done with the SDA line driver coupled to the SDA line of the I²C bus.

3. The method according to claim 2, wherein the SDA line driver is at a low impedance between a voltage source and the SDA line during the first pulse time duration.

4. The method according to claim 1, wherein the step of charging the SCL line capacitance is done with the SCL line driver coupled to the SCL line of the I²C bus.

5. The method according to claim 4, wherein the SCL line driver is at a low impedance between a voltage source and the SCL line during the second pulse time duration.

6. The method according to claim 1, wherein the first pulse time duration is from about 24 nanoseconds to about 42 nanoseconds.

7. The method according to claim 1, wherein the first pulse time duration is about 24 nanoseconds.

8. The method according to claim 1, wherein the first pulse time duration is about 42 nanoseconds.

9. The method according to claim 1, wherein the second pulse time duration is from about 24 nanoseconds to about 42 nanoseconds.

10. The method according to claim 1, wherein the second pulse time duration is about 24 nanoseconds.

11. The method according to claim 1, wherein the second pulse time duration is about 42 nanoseconds.

12. The method according to claim 1, wherein the internal SDA and SCL signals have data rates from about 400 kHz to about 5 MHz.

13. The method according to claim 1, wherein the internal SDA and SCL signals have data rates above 5 MHz.

14. The method according to claim 1, wherein the first pulse time duration is determined by a combined propagation delay of a number of series connected logic gates.

15. The method according to claim 1, wherein the second pulse time duration is determined by a combined propagation delay of a number of series connected logic gates.

16. The method according to claim 1, wherein the first pulse time duration is determined by a resistor-capacitor delay circuit.

17. The method according to claim 1, wherein the second pulse time duration is determined by a resistor-capacitor delay circuit.

18. The method according to claim 1, wherein the first and second pulse time durations are selectable.

19. The method according to claim 1, further comprising the step of selecting between the first pulse time duration of about 24 nanoseconds and about 42 nanoseconds.

20. The method according to claim 1, further comprising the step of selecting between the second pulse time duration of about 24 nanoseconds and about 42 nanoseconds.

21. The method according to claim 1, wherein the first logic level is a high logic level.

\* \* \* \* \*